United States Patent Office 2,960,494
Patented Nov. 15, 1960

2,960,494
RESIN PRODUCT

John R. Lewis, Wilmington, Del., assignor to Hercules Powder Company, Wilmington, Del., a corporation of Delaware No Drawing. Filed Nov. 14, 1958, Ser. No. 773,834

4 Claims. (Cl. 260—51)

This invention relates to a novel resin and a process for its preparation and more particularly, to a resin which is characterized by substantial insolubility in acetone and a softening point above 290° C.

It is known that when cumene hydroperoxide is cleaved by contacting it with acidic catalysts such as sulfuric acid and acid treated clays there is produced a cleavage mixture containing phenol and acetone as the principal products. However, the mixture also contains α-methylstyrene, acetophenone, dimethylphenylcarbinol and cumylphenol as by-products, and it may contain some unreacted cumene. The corresponding mixture obtained by cleavage of p-cymene hydroperoxide is known to contain acetone, p-cresol, α-methyl-p-methylstyrene, p-methyl acetophenone, dimethyl-p-methylphenylcarbinol, cymyl cresol and unreacted p-cymene.

The components of the aforementioned cleavage mixtures are preferably recovered therefrom by fractional distillation. With particular reference to the mixture from cleavage of cumene hydroperoxide, the distillation fundamentally results in obtaining an acetone fraction, a phenol fraction and a residue comprising cumylphenol. In more detail, however, the distillation may be carried out to obtain a first fraction comprising acetone, a second fraction comprising α-methylstyrene, any unreacted cumene if present, and water, a third fraction comprising phenol, and a residue comprising acetophenone, dimethylphenylcarbinol, cumylphenol and some resinous matter formed by polymerization of α-methylstyrene. Alternatively, the cumene and α-methylstyrene may be collected with the acetone fraction or the phenol fraction and separated therefrom by subsequent distillation.

The residue comprising acetophenone, dimethylphenylcarbinol, cumylphenol, and the resinous matter formed by polymerization of α-methylstyrene may be subjected to further distillation for the purpose of removing all or part of the acetophenone and, if desired, the carbinol. This residue, either with or without removal of acetophenone and carbinol, may be subjected to pyrolysis as described in U.S. 2,715,145 to Bewley et al. for the purpose of recovering additional quantities of phenol and α-methylstyrene. This pyrolysis is generally carried out at temperatures between about 200° C. and 400° C., and concurrent with the pyrolysis treatment, the volatile products thereby formed are removed from the reaction mixture. With removal of these volatile components, there remains an undistillable tar which has previously found no recognized utility except as a fuel. It is this tar and the corresponding one obtained in working up a cymene hydroperoxide cleavage mixture which constitute the starting materials of the present invention. For the purpose of convenience, the tar obtained from processing of a cumene hydroperoxide mixture will be designated as "phenol tar" and that from the cymene hydroperoxide cleavage mixture as "cresol tar."

In accordance with this invention it has been found that phenol tar and cresol tar may be converted into resinous materials having very high softening points and substantial insolubility in acetone by heating these tars at a temperature between about 250° C. and about 450° C. The resins so produced are particularly useful as components of brake lining compositions. They also may find application as components of foundry shell molding compositions, abrasive binders, ceramic binders and as extenders in both rubber and thermoplastic compositions.

The resins and the process for their preparation are more particularly described in the following examples. In this specification all parts and percentages are by weight.

*Example 1*

To an open kettle equipped with an efficient stirrer and a temperature measuring means was added 9080 parts of phenol tar. The tar was melted and then heated by raising the temperature to 300° C. over a period of 0.5 hour. This temperature was held for an additional 0.5 hour after which time the tar was allowed to cool to 250° C. over a period of 0.5 hour. When the temperature of 250° C. was reached, there was gradually added to the kettle 545 parts of hexamethylenetetramine. This amounted to 6% based on the amount of tar. Addition of the hexamethylenetetramine was carried out over 1.5 hours, thus keeping foaming at a minimum. The viscosity of the reaction mixture gradually increased, this requiring more intensive stirring. During the addition of hexamethylenetetramine the temperature was gradually increased until it reached 400° C. This temperature then was maintained until the resin gelled, this requiring approximately 0.5 hour. The gel was allowed to cool and the resin chipped out of the kettle. The yield of resin was 4,829 parts (50.2% based on total additions to the kettle) and the resin had an acetone solubility of 10.5% and was substantially infusible at 300° C.

The acetone solubility was determined by grinding a sample of the resin and then passing it through 60- and 80-mesh screens. The particles that went through the 60-mesh screen but were retained on the 80-mesh screen were chosen to be acetone extracted. An approximate 25-gram sample of such material was placed in a weighed thimble and the weight of the resin corrected to three decimal places obtained. The thimble was placed in a Soxhlet column and extracted with acetone until the effluent was clear. The thimble was then dried in a vacuum dessicator and weighed to three decimal places. The percent acetone soluble material was calculated as $$\frac{\text{weight lost}}{\text{weight of sample}} \times 100$$

*Example 2*

An apparatus similar to that in Example 1 except for addition of a condenser was used. The vessel was charged with 346.8 parts of phenol tar which was heated until it had melted, at which time stirring was begun. Over a period of 6 hours, the reaction mixture was heated gradually until a top temperature of 404° C. was reached. On cooling, there was obtained 223.8 parts (64.4% yield) of a hard resin having an acetone solubility of 9% and which was substantially infusible at 300° C.

*Example 3*

The apparatus used in Example 2 was charged with 347 parts of p-cresol tar. This was heated and stirred, and over a period of 2.7 hours the temperature was gradually increased to 412° C. After cooling, there was obtained 200 parts (58% yield) of a resin having an acetone solubility of 7.1% and which was substantially infusible at 300° C.

In both Examples 2 and 3 there was collected an overhead distillate representing a substantial portion of the original tar. The distillate obtained in Example 2 was analyzed and found to be composed of 30±10% cumene, 7% α-methylstyrene, 1.4% acetophenone, 20% phenol, 3% cumylphenol and the balance unknown. In addition to being characterized by the presence of components such as those just described, the phenol and cresol tars used as starting materials in accordance with this invention are believed to contain a high percentage of polymers of α-methylstyrene (phenol tar) or α,p-dimethylstyrene (cresol tar). The tars may be further represented by the following typical analyses:

|  | Phenol Tar | Cresol Tar |
| --- | --- | --- |
| Softening Point, ° C | 55–105 | 109–150 |
| Acetone Solubility | Soluble | Soluble |
| Acid Number (ethylene diamine) | 106–119 | 69–82 |
| Percent Hydroxyl (by acetylation) | 1.7–5.9 | 2.5–2.6 |
| Molecular Weight | 570–575 | 518–561 |
| Viscosity (poises) | 30–120 |  |

The process of this invention has been described in the examples as being carried out at temperatures ranging from about 250° C. to about 400° C. However, the maximum temperature may be about 450° C. A preferable range is from about 300° C. to about 400° C. and when, as in Example 1, hexamethylenetetramine is added, it is preferred to carry out this addition at a lower temperature, for example, about 250° C. followed by subsequent elevation of the temperature to complete the reaction. The amount of hexamethylenetetramine may be from 0 to about 10%, preferably about 2 to about 8%, by weight based on the amount of phenol or cresol tar.

Care should be exercised in using temperatures above 400° C. for long periods of time when the reaction mixture is open to the atmosphere, since under these conditions the resins have a tendency to ignite and burn. This can be overcome, however, by carrying out the reaction in a closed system, which also results in more efficient reaction and higher yields. Upon completion of the reaction, the resin is cooled and reduced in particle size, as by grinding. However, a desirable modification is that wherein the resin is formed on a moving belt and is continuously cooled and flaked off.

The novel resins of this invention are characterized by softening points above about 290° C. and by susbtantial insolubility in acetone. The latter is defined as corresponding to an acetone soluble content of not more than about 10%. Many of the resins of this invention are practically infusible at 300° C., and it is this property, as well as that relating to acetone insolubility, which renders the resins extremely useful as components of brake lining compositions.

Brake lining compositions are ordinarily composed of about 60–70% asbestos, alone or with other fillers, about 25–30% of a phenolic resin binder, such as phenol-formaldehyde resins and modified phenol-formaldehyde resins, and about 10–15% of particles of a frictioning agent, such as the cashew nut shell oil resins in current usage. The suitability of a lining composition is determined by a wear test which measures the loss of the composition in cubic inches per horsepower hour.

Using a typical formulation, two lining compositions were prepared which were identical except for the frictioning agent used. In one, the standard, the agent was cashew nut shell oil resin, and in the other the agent was a resin prepared as in Example 1. The standard lining showed a loss 0.0055 cubic inches per horsepower hour in the wear test, whereas the lining containing the resin of this invention showed a loss of 0.0042 cubic inches per horsepower hour, thus establishing the advantage to be gained through use of the resin of this invention.

What I claim and desire to protect by Letters Patent is:

1. The process for preparing a novel resin characterized by substantial insolubility in acetone and a softening point above 290° C. which comprises heating, at a temperature between about 250° C. and about 450° C., the undistillable tar remaining after removal by volatization at the pyrolysis temperature of volatile components from the reaction mixture created by pyrolyzing the high-boiling residue formed in the recovery of acetone and a phenol from the product of acid-catalyzed decomposition of a hydroperoxide selected from the group consisting of cumene hydroperoxide and cymene hydroperoxide.

2. The process of claim 1 wherein the temperature is between about 300° C. and about 400° C.

3. The process of claim 1 wherein hexamethylenetetramine is added to the tar during the heating step.

4. A novel resin produced by the process of claim 1.

References Cited in the file of this patent
UNITED STATES PATENTS
2,715,145    Bewley et al. _____ Aug. 16, 1955